United States Patent
Hill

(10) Patent No.: US 10,015,354 B2
(45) Date of Patent: Jul. 3, 2018

(54) AUTHENTICATION DEVICE AND ASSOCIATED AUTHENTICATION METHOD BASED ON A DIFFERENCE IN ALIGNMENT OR A SIMILARITY IN RELATIVE POSITION OF FEATURES OF UNIQUE IDENTIFIERS PRINTED OVER IMAGES AND/OR TEXT

(71) Applicant: OPSEC SECURITY GROUP, INC., Lakewood, CO (US)

(72) Inventor: Dean Hill, New Freedom, PA (US)

(73) Assignee: OPTIC SECURITY GROUP, INC., Lakewood, CO (US)

(*) Notice: Subject to any disclaimer, the term of this patent is extended or adjusted under 35 U.S.C. 154(b) by 0 days.

(21) Appl. No.: 15/200,164

(22) Filed: Jul. 1, 2016

(65) Prior Publication Data

US 2017/0006180 A1 Jan. 5, 2017

Related U.S. Application Data

(60) Provisional application No. 62/187,903, filed on Jul. 2, 2015.

(51) Int. Cl.
*H04N 1/32* (2006.01)
*H04N 1/00* (2006.01)
*G06K 19/06* (2006.01)

(52) U.S. Cl.
CPC ... *H04N 1/32133* (2013.01); *G06K 19/06046* (2013.01); *G06K 19/06056* (2013.01); *G06K 19/06178* (2013.01); *H04N 1/00334* (2013.01); *H04N 1/32128* (2013.01); *H04N 1/32144* (2013.01); *H04N 1/32149* (2013.01); *G06K 2019/06262* (2013.01); *H04N 2201/3236* (2013.01); *H04N 2201/3243* (2013.01); *H04N 2201/3269* (2013.01)

(58) Field of Classification Search
CPC ......... H04N 1/00334; H04N 1/32128; H04N 1/32133; H04N 1/32144; H04N 1/32149; H04N 2201/3233–2201/324; G06K 19/06046; G06K 19/06056; G06K 19/06178; G06K 2019/06262
See application file for complete search history.

(56) References Cited

U.S. PATENT DOCUMENTS 5,129,014 A * 7/1992 Bloomberg ............... G06T 3/00
348/86
5,974,150 A * 10/1999 Kaish .................. G06K 19/086
283/85

(Continued)

OTHER PUBLICATIONS

PCT International Search Report and Written Opinion; PCT Application No. PCT/US2016/040335, filed Jun. 30, 2016, Authorized Officer Shane Thomas, dated Sep. 26, 2016; Search Completed Aug. 21, 2016.

*Primary Examiner* — Scott A Rogers
(74) *Attorney, Agent, or Firm* — Eckert Seamans Cherin & Mellott, LLC; Nathaniel C. Wilks

(57) ABSTRACT

A method including generating first images and/or text on a plurality of items, printing a plurality of unique identifiers, each unique identifier being printed over the images and/or text on a corresponding one of the plurality of items, capturing a plurality of second images, each second image including a corresponding one of the plurality of unique identifiers, and storing the captured plurality of second images in a computer readable memory.

28 Claims, 3 Drawing Sheets

(56) References Cited

U.S. PATENT DOCUMENTS

| | | | | |
|---|---|---|---|---|
| 6,928,552 B1* | 8/2005 | Mischenko | ............ | G06K 19/086 |
| | | | | 726/22 |
| 7,337,957 B2* | 3/2008 | Ashizaki | ................ | G03H 1/268 |
| | | | | 235/380 |
| 8,199,913 B2* | 6/2012 | Alasia | ................... | H04N 1/448 |
| | | | | 235/380 |
| 8,903,181 B2* | 12/2014 | Gangadharan | ........ | G06K 19/086 |
| | | | | 382/218 |
| 9,234,992 B2* | 1/2016 | Hill | ...................... | G02B 5/1842 |
| 9,666,008 B2* | 5/2017 | Hill | ...................... | G07D 7/0032 |
| 2007/0257977 A1* | 11/2007 | Wicker | .................. | B41M 3/146 |
| | | | | 347/107 |
| 2007/0291362 A1* | 12/2007 | Hill | ...................... | G02B 5/1842 |
| | | | | 359/567 |
| 2010/0110514 A1 | 5/2010 | Houha et al. | | |
| 2011/0049862 A1* | 3/2011 | Hill | ...................... | G07D 7/0033 |
| | | | | 283/70 |
| 2011/0240739 A1 | 10/2011 | Delaigle et al. | | |
| 2013/0320099 A1* | 12/2013 | Acton | ............... | G06K 19/06056 |
| | | | | 235/494 |
| 2014/0355069 A1* | 12/2014 | Caton | .................. | H04N 1/0087 |
| | | | | 358/3.28 |
| 2015/0053755 A1 | 2/2015 | Wood et al. | | |
| 2017/0032381 A1* | 2/2017 | Vaidyanathan | .... | G06Q 30/0185 |

* cited by examiner

AUTHENTICATION DEVICE AND ASSOCIATED AUTHENTICATION METHOD BASED ON A DIFFERENCE IN ALIGNMENT OR A SIMILARITY IN RELATIVE POSITION OF FEATURES OF UNIQUE IDENTIFIERS PRINTED OVER IMAGES AND/OR TEXT

CROSS-REFERENCE TO RELATED APPLICATION

This patent application claims the priority benefit under 35 U.S.C. § 119(e) of U.S. Provisional Application No. 62/187,903 filed on Jul. 2, 2015, and entitled, "AUTHENTICATION DEVICE AND ASSOCIATED AUTHENTICATION METHOD," the contents of which are hereby incorporated herein by reference.

BACKGROUND

Field

The disclosed concept relates generally to authentication and, more particularly, to authentication of products and documents.

Description of Related Art

A well-established solution for anti-counterfeiting and authentication of authorized products and documents is the following: a single complex anti-counterfeiting security image, such as a hologram, is originated then mass reproduced in label or foil form, with a unique identification number applied to each resulting security device, by an anti-counterfeiting security provider. The security provider controls the distribution of the resulting security devices to only those facilities that are authorized by a brand owner or government agency to produce the associated authorized products or documents. The unique identification numbers are used to quantify and track the supply of the security devices to each authorized factory or facility where they are applied to the authorized products or documents. The security provider maintains a record of shipments of security devices to the authorized factories and facilities.

After a security device is applied to an authorized product or document, a determination of authenticity can be made, at any time thereafter, by verifying features within the security device. Counterfeiters may be able to copy the product or document to an extent that the forgery is difficult to detect, but they are not able to copy the security features in the security device to the same extent. A determination of the product or document's factory or facility of origin can be made at any time by verifying the security provider's record of the security device's unique identification number.

While this solution is effective in a large number of applications, there are applications where there is a need for an improved solution. For example, the higher the value to be gained by counterfeiting the products or documents, the higher the investment by the counterfeiters in attempting to also counterfeit the security devices. As the quality of counterfeited security devices improves, brand owners and government officials require more specialized knowledge and tools to verify the authenticity of the security device and thereby the good or document. For high value and high volume goods, an improved solution is needed to make it easier for large numbers of people to easily authenticate goods without the need for special knowledge or tools.

SUMMARY OF THE INVENTION

These needs and others are met by embodiments of the disclosed concept, which provides a method or system for producing a security device or security element including capturing an image of the security device or element. The disclosed concept also provide a method or system for authenticating a security device or element using a captured image of the security device or security element.

In accordance with an aspect of the disclosed concept, a method comprises: generating first images and/or text on a plurality of items; printing a plurality of unique identifiers, each unique identifier being printed over the images and/or text on a corresponding one of the plurality of items; capturing a plurality of second images, each second image including a corresponding one of the plurality of unique identifiers; and storing the captured plurality of second images in a computer readable memory.

In accordance with another aspect of the disclosed concept, a method comprises: providing an item having first images and/or text generated thereon and a unique identifier printed over the first images and/or text; capturing a second image including at least a portion of the unique identifier; determining a corresponding third image based on the unique identifier, wherein the third image is a previously captured image associated with the unique identifier; determining a similarity level of the second image and the third image by comparing the second image and the third image with each other; and determining that the item is authentic if the determined similarity level is above a threshold similarity level.

In accordance with another aspect of the disclosed concept, a system comprises: an image generating device structured to generate first images and/or text on a plurality of items; a printing device structured to print a plurality of unique identifiers, each unique identifier being printed over the images and/or text on a corresponding one of the plurality of items; an image capturing device structured to capture a plurality of second images, each second image including a corresponding one of the plurality of unique identifiers; and a computer readable memory structured to store the captured plurality of second images.

In accordance with another aspect of the disclosed concept, a system comprising: an image capturing device structured to capture a first image of an item having second images and/or text generated thereon and a unique identifier printed over the second images and/or text, wherein the first image includes at least a portion of the unique identifier; a processor including a routine structured to: determine a corresponding third image based on the unique identifier, wherein the third image is a previously captured image associated with the unique identifier; determine a similarity level of the second image and the third image by comparing the second image and the third image with each other; and determine that the item is authentic if the determined similarity level is above a threshold similarity level.

DESCRIPTION OF THE PREFERRED EMBODIMENTS

Figure 1:
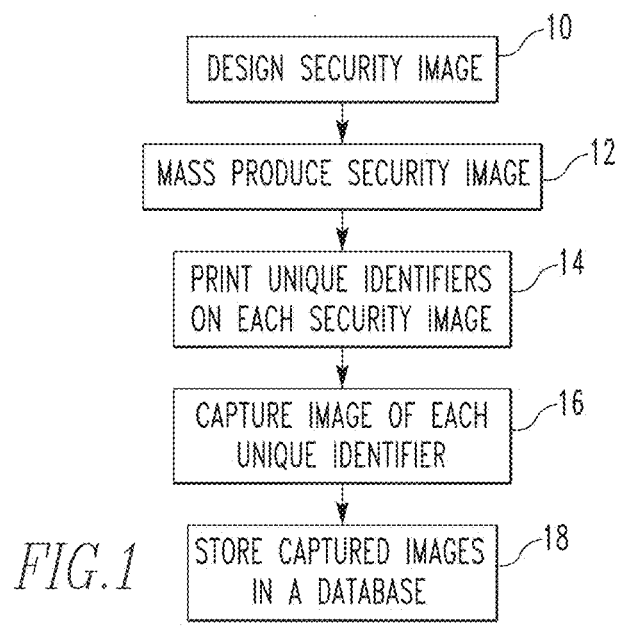
FIG. 1 is a flowchart of a method of creating a security device in accordance with an exemplary embodiment of the disclosed concept.
Figure 2:
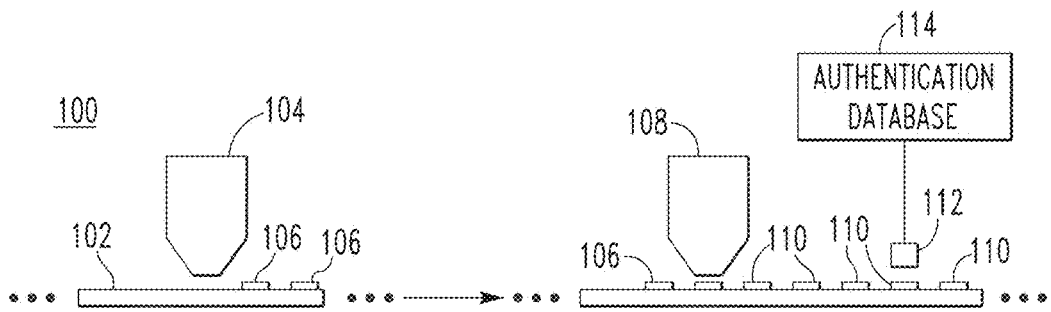
FIG. 2 is a schematic diagram of a system for creating a security device in accordance with an exemplary embodiment of the disclosed concept.

A flowchart of a method for creating a security device in accordance with an exemplary embodiment of the disclosed concept is shown in FIG. 1 and a schematic diagram of a system 100 for creating a security device or article with a security element in accordance with some example embodiments of the disclosed concept is shown in FIG. 2. At 10, a single security image is designed. In some exemplary embodiments of the disclosed concept, the security image includes a pattern of reference marks in an area where a unique identifier such as, without limitation, a unique identification number or a unique barcode, will be printed in the later stages of production.

At 12, the security image is mass produced in a label or foil form. The label or foil form may be suitable for application to products or documents. In some example embodiments of the disclosed concept, the security image is formed as a surface relief (e.g., without limitation, embossed, cast, etc.) on the label or foil. For example, in some embodiments, the security image is embossed on the label or foil form. Embossing results in an image that is considerably difficult to reproduce accurately. In more detail, a label or foil substrate 102 is embossed using an image generating device 104 to create the security image 106. It will be appreciated by those having ordinary skill in the art that the image generating device 104 may be various types of devices suitable for forming an image on a label, foil, document, product, product packaging, etc. without departing from the scope of the disclosed concept. For example and without limitation, in some example embodiments of the disclosed concept, the image generating device 104 is a surface relief generating device such as an embossing device suitable to emboss the security image 106. In some other example embodiments of the disclosed concept, the image generating device 104 is an image printing device such as, for example and without limitation, a printer suitable to print the security image.

Additionally, in some example embodiments of the disclosed concept, the security image may be formed by other surface relief generating processes such as a casting process. For example and without limitation, image generating device 104 may be a casting device capable of creating cast security images 106. Casting may be performed, for example, by making an impression of the security images 106 in liquid which is then cured so the liquid hardens. It will also be appreciated by those having ordinary skill in the art that the security images 106 may be generated using any suitable process without departing from the scope of the disclosed concept.

In some example embodiments of the disclosed concept, the security image is a barcode. The barcode may be static and identify a brand, agency, or program that it associates to. The level of error correction in the barcode may be high enough that the barcode may still be read even if numbers or other text are printed on top of the barcode.

At 14, a unique identifier is printed on each of the security images. In some example embodiments of the disclosed concept, the unique identifier is a unique identification number. In exemplary embodiments where the security image 106 includes the pattern of reference marks, the unique identifier may be printed over the pattern of reference marks. In more detail, a unique identifier is printed on the security image 106 using a printing device 108 (e.g., without limitation, a printer) to create a security device 110 having a security image 106 with an overlying unique identifier printed thereon.

The unique identifier is an identifier that is unique to the security device 110 that it is printed on. For example, if two security devices 110 are created, each one will have a different unique identifier. In the case that the unique identifier is a unique identification number, each security device 110 will have a different unique identification number printed thereon.

At 16, a camera 112 (or other image capturing device), generally installed in-line with the printing device 108, captures an image of each security device 110. A processor (not shown) associated with the camera 112 and/or the authentication database 114 may execute one or more routines to store the captured images in the authentication database 114, read each unique identifier, and associate the captured images with the read unique identifiers. For example, the routines may include image processing software to read each unique identifier. Reading the unique identifier refers to processing an image of the unique identifier so that a value of the unique identifier number can be stored in a computer readable memory. For example, in embodiments where the unique identifier is a unique identification number, the value of the unique identification number may be read and associated with the captured image of the security device 110. For instance, if the unique identification number is '5061', image processing software may be used to read the value '5061' from the unique identification number and associated it with the security device 110. At 18, the captured images of each security device 110 are stored in an authentication database 114. It will be appreciated that the captured images may be stored in the authentication database 114 in such a manner that they are searchable by the security image and unique identifier. For example, searching for a value of the unique identifier may result in an image of the security device 110 having a unique identifier with the same value. It will also be appreciated by those having ordinary skill in the art that a portion of the captured images, rather than the entire captured image may be stored in the database in order to minimize storage requirements.

The relative size and frequency of features in the security images, such as the pattern of reference marks, the size of the unique identifiers, and the resolution of the camera 112 used to capture images of the security images and unique identifiers, are all specified to precisely indicate the placement of the unique identifier on the security image. For example and without limitation, the relative size and frequency of features in the security images, such as the pattern of reference marks, the size of the unique identifiers, and the resolution of the camera used to capture images of the security images and unique identifiers may have a tolerance of +/−0.001 inch or better in any direction in the plane of the numbered surface. The resolution of modern cameras and vision systems is far greater than the tolerance of modern print registration systems so modern print registration systems would not be able to accurately place the unique identifier on a pre-existing security image as accurately. The misplacement of the unique identifier and/or security image due to the limited tolerance of modern print registration systems would be able to be detected by comparing the copy of the security device with the captured image of the original security device.

The security devices 110 with unique identifiers overlying security images may be supplied to authorized factories or facilities to be applied to authorized goods or documents. In some example embodiments of the disclosed concept, the security image and unique identifier may be printed directly on an article such as a product, product packaging, document, or other item rather than the security device 110. Authentication of the security devices 110 and/or articles will be described in more detail with respect to FIG. 4.

In some example embodiments of the disclosed concept, the disclosed concept may also be used to provide enhanced security on an article (e.g., without limitation, a product, product packaging, document, or other item to be authenticated) without a security image. Such security may be less robust than embodiments using an embossed security image discussed above, but could be implemented with less cost. In some embodiments, a unique identifier may be printed over text and/or images on the article with a printing method having a different resolution, using elements of the article's imagery or text as a pattern of reference marks.

Figure 3:
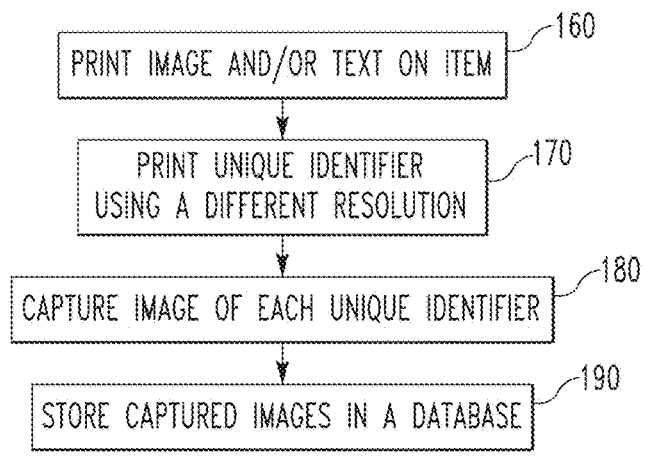
FIG. 3 is a flowchart of a method of creating a security element in accordance with an exemplary embodiment of the disclosed concept.

FIG. 3 is a flow chart of a method of creating a security element in accordance with some embodiments of the disclosed concept. At 160, images and/or text are printed on the article with a relatively high resolution printing process. The images and/or text may be images and/or text that are normally part of the article. For example, the text may be the text of the document or the images may be images on product packaging. At 170, a unique identifier (e.g., a unique identification number or unique barcode) is printed onto each article over the text and/or images using a standard resolution printing process (i.e. a resolution lower than the resolution used to print the text and/or images). The difference in resolution of the two printing processes results in variations in alignment between the text and/or images printed on each article and the elements of each overprinted unique identifier. Although as described herein, the printing resolution of the text and/or images on the article is higher than the printing resolution of the unique identifier, those skilled in the art will recognize that the concept is equally functional if the unique identifier is printed in high resolution and the text and/or images on the article are printed with standard resolution, the functional requirement being that the difference between printing resolutions must be sufficient to result in a variable registration deviation from article to article. The juxtaposition of the unique identifier over the text and/or images of the article creates a form of security element useful for authentication with a less secure, but lower cost, security device.

It is contemplated that the system 100 of FIG. 2, or a similar system, may be used to create the security element on the article. For example, image generating device 104 may be used to generate text and/or images on an article using a printing process having one resolution and printing device 108 may be used to overprint unique identifiers on articles using a different resolution printing process. Once the article with the overprinted unique identifier has been created, it may be photographed and recorded using the system 100 of FIG. 2 or a similar system.

For example, at 180, the camera 112, which may be installed in-line with the printing device 108, captures an image of the security element (i.e. the area where the unique identifier is printed over the text and/or images on an article) of an article. Image processing software is employed to read each unique identifier. Reading the unique identifier refers to processing an image of the unique identifier so that the value of the unique identifier can be stored in a computer-readable memory. At 190, the captured images of each security element are stored in an authentication database 114, searchable by the unique identifier. It will be appreciated that a portion of the captured images, rather than the entire captured image, may be stored in the database in order to minimize storage requirements.

Figure 4:
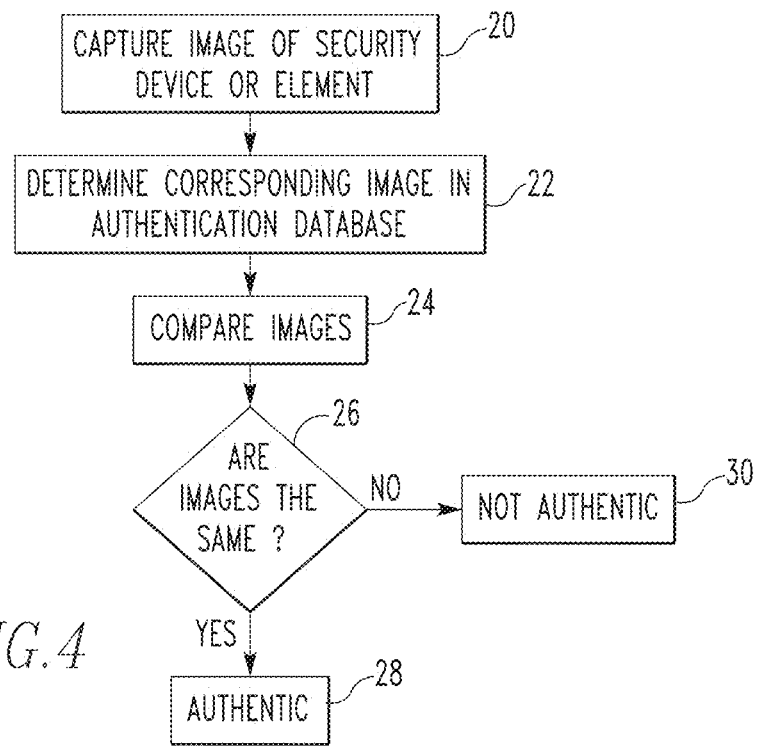
FIG. 4 is a flowchart of a method of authenticating a security device in accordance with an exemplary embodiment of the disclosed concept.
Figure 5:
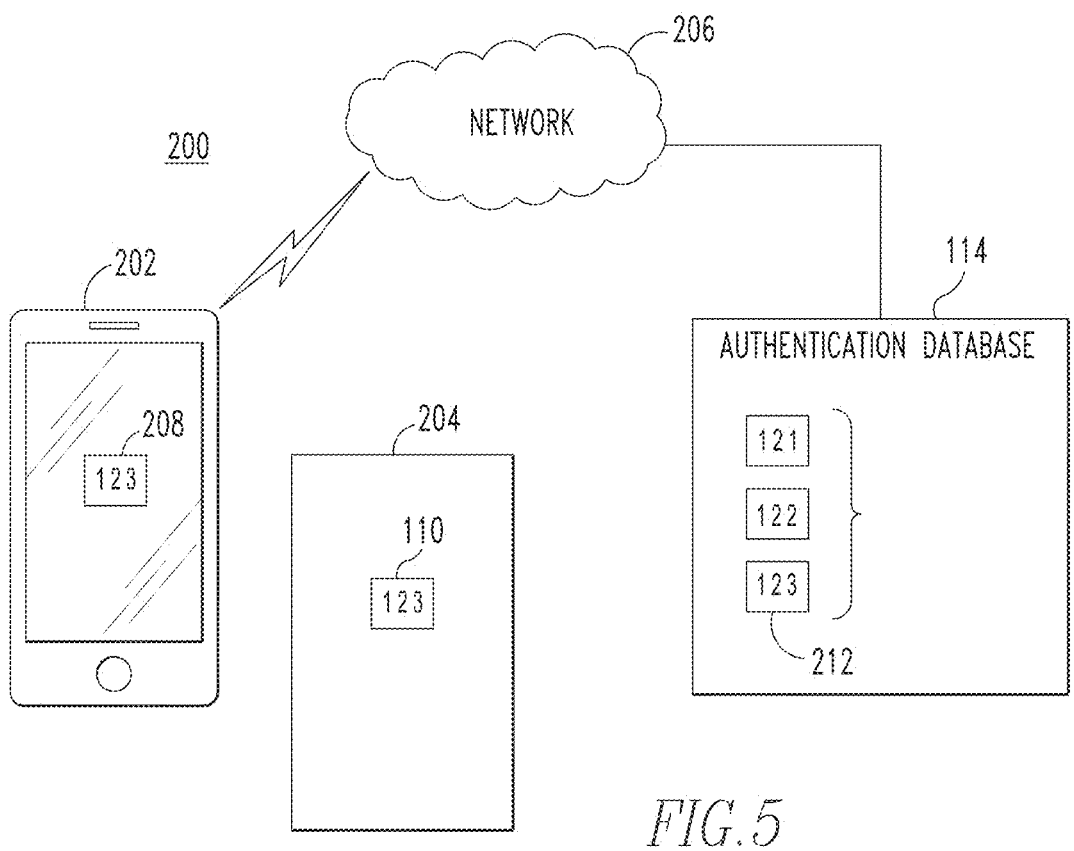
FIG. 5 is a schematic diagram of a system for authenticating a security device in accordance with an exemplary embodiment of the disclosed concept.

FIG. 4 is a flowchart of a method of authenticating a security device 110 or article, such as a security device 110 produced using the method of FIG. 1 or the article with a security element produced using the method of FIG. 3. FIG. 5 is a schematic diagram of a system 200 for authenticating a security device 110 or article in accordance with an exemplary embodiment of the disclosed concept. At 20, a user captures an image 208 of the security device 110 or security element of an article including the unique identifier and underlying security image or text and/or images of the article using a user device 202. The security device 110 may be disposed on an article 204 such as a document or, as previously discussed with respect to FIG. 3, the security element may be formed by overprinting the unique identifier on the article. It will be appreciated by those having ordinary skill in the art that the user device 202 may be any suitable device such as a camera or a device including a camera to capture the image 208 of the security device 110 or security element. However, it will be appreciated that devices such as mobile phones, tablets or other such devices that are able to connect to the internet will make it easier for the user to upload the captured image. In some exemplary embodiments of the disclosed concept, the user device 202 reads the unique identifier from the captured image 208. In other exemplary embodiments of the disclosed concept, the unique identifier in the captured image is read by another device, such as one located by the authentication database 114. The user device 202 and authentication database 114 are able to communicate with each other via a network 206 such as the internet.

At 22, the image corresponding to the captured image 208 is obtained from the authentication database 114. That is, the authentication database 114 includes a number of images 210, each having a corresponding unique identifier. The image 212 in the authentication database 114 having the same unique identifier as the captured image 208 is determined to be the image 212 corresponding to the captured image 208.

At 24, the captured image 208 is compared to the corresponding image 212 in the authentication database 114. Known image recognition and comparison techniques may be employed to compare the captured image 208 with the corresponding image 212 in the authentication database 114. The result of the comparison may be a value indicative of how well selected features of the images match. For example and without limitation, the relative placement of features of the security image and the unique identifier may be compared in the captured image 208 and the corresponding image 212 stored in the authentication database 114 may be compared. By comparing features in the images, rather than the totality of the images themselves, differences due to different camera angles, types of cameras, lighting, and other characteristics may be minimized while features of the images are emphasized.

At 26, it is determined whether the captured image 208 and the corresponding image 212 in the authentication database 114 are similar enough to authenticate the security device 110 or article. For example and without limitation, the output of the comparison of the images may be a value and the determination of whether the security device 110 or article is authentic or not may be made by comparing the value to a predetermined threshold value. The result of the comparison may be a determination that the security device 110 or article is authentic at 28 or a determination that the security device is 110 or article not authentic at 30.

It will be appreciated by those having ordinary skill in the art that the method of authentication may be performed on the user's device 202. For example and without limitation, the method may be implemented as an application on a user device 202 such as a smart phone or tablet. For example and without limitation, the user device 202 may include an image capturing device (e.g., a camera) that may implement step 20 of the method shown in FIG. 4 and the user device 202 may include a processor including a routine which, when executed, may implement one or more of steps 22-28 of the method shown in FIG. 4. It is also contemplated that some steps of the method of authentication may be executed by another device such as, without limitation, a server or other computing device disposed remotely from the user (e.g., a server or other computing device disposed remotely from the user may include a processor including a routine which, when execute, may implement one or more of steps 22-28 of the method shown in FIG. 4). In some cases it may be advantageous to perform the comparison of the captured image 208 and the corresponding image 212 in the authentication database 114 remotely so as to prevent the user or user device 202 from obtaining a copy of the corresponding image 212 stored in the authentication database 114. In some embodiments of the disclosed concept, the user device 202 obtains a copy of the corresponding image 212 in the authentication database 114 and compares it to the captured image 208. In this case, the processing is offloaded to the user device 202.

Figure 6:
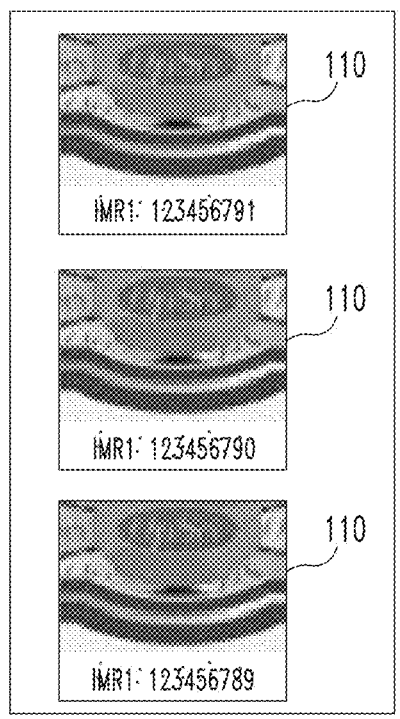
FIG. 6 is a view of a set of security devices with unique identification numbers in accordance with an exemplary embodiment of the disclosed concept.
Figure 7A:
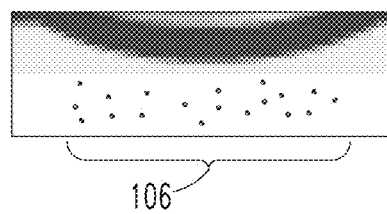
FIG. 7A is an view of a security image in accordance with an exemplary embodiment of the disclosed concept.
Figure 7B:
FIG. 7B is a view of a security image with an overlying unique identification number in accordance with an exemplary embodiment of the disclosed concept.

FIG. 6 is a view of security devices 110 including a security image and a unique identifier in accordance with an exemplary embodiment of the disclosed concept. FIG. 7A is a closer view of an embossed security image 106 and FIG. 7B is a closer view of a security device 110 including the security image and an overlying unique identification number. While FIGS. 6, 7A and 7B illustrate one type of security device 110, it will be appreciated by those having ordinary skill in the art that the designs of the security image and the unique identifier may be varied without departing from the scope of the disclosed concept. It is also contemplated that the unique identifier may be selected from various types of identification mechanisms such as, without limitation, a unique identification number or a unique bar code, without departing from the scope of the disclosed concept.

The disclosed concept creates a new barrier to the counterfeiters' ability to copy a security device, and at the same time makes it substantially easier for users to verify authenticity without the need for special knowledge or tools. Even if a counterfeiter manages to accurately copy one security device, which would be difficult due to the difficulty in accurately copying an embossed image, the counterfeiter would need to completely repeat the process for each subsequent security device, as unique images of each security device are stored in the authentication database. Counterfeiters are thus prevented from mass producing counterfeit security devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method comprising:
   generating first images and/or text on a plurality of items using a first printing process having a first resolution;
   printing a plurality of unique identifiers, each unique identifier being printed over the images and/or text on a corresponding one of the plurality of items using a second printing process having a second resolution different than the first resolution;
   capturing a plurality of second images, each second image including at least a portion of a corresponding one of the plurality of unique identifiers and at least a portion of a corresponding one of the first images and/or text; and
   storing the captured plurality of second images in a computer readable memory,
   wherein a difference between the first resolution and the second resolution results in an alignment between the first images and/or text and the unique identifier on a first of the plurality of items being different than an alignment between the first images and/or text and the unique identifier on a second of the plurality of items.

2. The method of claim 1, wherein generating first images and/or text on the plurality of items comprises: generating a plurality of security images, each security image being generated on a corresponding one of a plurality of security devices; and
   wherein printing the plurality of unique identifiers, each unique identifier being printed over the images and/or text on a corresponding one of the plurality of items comprises: each unique identifier being printed over the security image on a corresponding one of the plurality of items.

3. The method of claim 2, wherein at least one of the plurality of security images is generated as a surface relief on the corresponding one of the plurality of items.

4. The method of claim 2, wherein the plurality of security images includes at least one pattern of reference marks.

5. The method of claim 2, wherein the security devices include at least one of a label and a foil, and wherein the method further comprises:
   applying at least one of the security devices to an article.

6. The method of claim 1, wherein the plurality of items are a plurality of articles including at least one of a product, product packaging, and a document.

7. The method of claim 1, wherein the plurality of unique identifiers includes at least one of a unique identification number and a unique barcode.

8. A method comprising:
   providing an item having first images and/or text generated thereon and a unique identifier printed over the first images and/or text;
   capturing a second image including at least a portion of the first images and/or text and at least a portion of the unique identifier;
   determining a corresponding third image based on the unique identifier, wherein the third image is a previously captured image associated with the unique identifier and including at least a portion of the first images and/or text and at least a portion of the unique identifier;

determining a similarity level of the second image and the third image by comparing a relative placement of features of the first images and/or text with respect to the unique identifier in the second image to a relative placement of features of the second images and/or text with respect to the unique identifier in the third image; and determining that the item is authentic if the determined similarity level is above a threshold similarity level.

9. The method of claim 8, wherein the first images and/or text are a security image, wherein the item is a security device applied to an article, and wherein the article is at least one of a product, product packaging, and a document.

10. The method of claim 9, wherein the security image is a surface relief formed on the item.

11. The method of claim 9, wherein the security image is a pattern of reference marks.

12. The method of claim 8, wherein the item is an article including at least one of a product, product packaging, and a document, and wherein the first images and/or text are generated on the article and the unique identifier is printed over the first images and/or text.

13. The method of claim 8, wherein the unique identifier includes at least one of a unique identification number and a unique barcode.

14. The method of claim 8, wherein the third image is captured and stored in an authentication database at the time of manufacturing of the item.

15. A system comprising:
an image generating device structured to generate first images and/or text on a plurality of items using a first resolution;
a printing device structured to print a plurality of unique identifiers using a second resolution different than the first resolution, each unique identifier being printed over the first images and/or text on a corresponding one of the plurality of items;
an image capturing device structured to capture a plurality of second images, each second image including at least a portion of a corresponding one of the plurality of unique identifiers and at least a portion of a corresponding one of the first images and/or text; and
a computer readable memory structured to store the captured plurality of second images,
wherein a difference between the first resolution and the second resolution results in an alignment between the first images and/or text and the unique identifier on a first of the plurality of items being different than an alignment between the first images and/or text and the unique identifier on a second of the plurality of items.

16. The system of claim 15, wherein the first images and/or text are a plurality of security images, each security image being generated on a corresponding one of a plurality of security devices.

17. The system of claim 16, wherein the image generating device is a surface relief generating device structured to generate at least one of the plurality of security images as a surface relief on the corresponding one of the plurality of items.

18. The system of claim 16, wherein the plurality of security images includes at least one pattern of reference marks.

19. The system of claim 16, wherein the security devices include at least one of a label and a foil.

20. The system of claim 15, wherein the plurality of items are a plurality of articles including at least one of a product, product packaging, and a document.

21. The system of claim 15, wherein the plurality of unique identifiers includes at least one of a unique identification number and a unique barcode.

22. A system comprising:
an image capturing device structured to capture a first image of an item having second images and/or text generated thereon and a unique identifier printed over the second images and/or text, wherein the first image includes the unique identifier and at least a portion of the second images and/or text;
a processor including a routine structured to:
determine a corresponding third image based on the unique identifier, wherein the third image is a previously captured image associated with the unique identifier and including at least a portion of the unique identifier and at least a portion of the second images and/or text;
determine a similarity level of the first image and the third image by comparing a relative placement of features of the second images and/or text with respect to the unique identifier in the first image to a relative placement of features of the second images and/or text with respect to the unique identifier in the third image; and
determine that the item is authentic if the determined similarity level is above a threshold similarity level.

23. The system of claim 22, wherein the second images and/or text are a security image, wherein the item is a security device applied to an article, and wherein the article is at least one of a product, product packaging, and a document.

24. The system of claim 23, wherein the security image is a surface relief formed on the item.

25. The system of claim 23, wherein the security image is a pattern of reference marks.

26. The system of claim 22, wherein the item is an article including at least one of a product, product packaging, and a document, and wherein the first images and/or text are generated on the article and the unique identifier is printed over the first images and/or text.

27. The system of claim 22, wherein the unique identifier includes at least one of a unique identification number and a unique barcode.

28. The system of claim 22, further comprising:
an authentication database structured to receive and store the third image at the time of manufacturing of the item.

* * * * *